United States Patent
Skender

[11] Patent Number: 6,012,444
[45] Date of Patent: Jan. 11, 2000

[54] RADIANT COOKING WITH BURNERS MOUNTED OVER THE COOKING MEDIUM

[76] Inventor: David J. Skender, 705 Brow Ct., Peoria, Ill. 61615

[21] Appl. No.: 09/174,403

[22] Filed: Oct. 19, 1998

[51] Int. Cl.[7] .................................................. A47J 37/00
[52] U.S. Cl. .................. 126/41 R; 126/21 A; 126/273.5; 126/92 B; 126/92 C; 99/447; 99/444
[58] Field of Search ............................... 126/41 R, 39 J, 126/39 F, 39 D, 92 AC, 92 B, 92 R, 92 C, 273.5, 146, 21 R, 21 A, 680, 681, 684, 273 R; 99/447, 444, 401, 385

[56] References Cited

U.S. PATENT DOCUMENTS

| | | | |
|---|---|---|---|
| 2,415,223 | 2/1947 | Stangle | 126/41 R |
| 2,655,991 | 10/1953 | Kennedy | 126/41 R |
| 2,696,813 | 12/1954 | Clarke . | |
| 2,920,177 | 1/1960 | Brane . | |
| 3,098,477 | 7/1963 | Lotter . | |
| 3,103,160 | 9/1963 | Forniti et al. | 126/41 R |
| 3,114,363 | 12/1963 | Koltun . | |
| 3,263,594 | 8/1966 | Appleman | 126/41 R |
| 3,413,912 | 12/1968 | Phelan et al. | 126/41 R |
| 3,460,460 | 8/1969 | Bixby et al. | 126/41 R |
| 3,528,399 | 9/1970 | Perl | 126/41 R |
| 3,547,097 | 12/1970 | Rice | 126/41 R |
| 4,321,857 | 3/1982 | Best | 126/41 R |
| 4,454,805 | 6/1984 | Matthews | 99/446 |
| 4,535,750 | 8/1985 | Herbert et al. | 126/41 B |
| 4,561,418 | 12/1985 | Cairns | 126/41 R |
| 4,627,410 | 12/1986 | Jung | 126/41 R |
| 4,628,897 | 12/1986 | Stanfa et al. | 126/41 R |
| 4,683,867 | 8/1987 | Beatty | 126/41 R |
| 4,776,319 | 10/1988 | Colangelo et al. | 126/41 R |
| 4,805,588 | 2/1989 | Reynolds | 126/41 A |
| 5,094,221 | 3/1992 | Ho | 126/41 R |
| 5,195,425 | 3/1993 | Koziol | 126/41 R |
| 5,279,277 | 1/1994 | Barker | 126/41 R |
| 5,678,531 | 10/1997 | Byers et al. | 126/41 R |

OTHER PUBLICATIONS

"TEC 2001 Infra–Red Gas Grill" brochure, Thermal Engineering Corporation.
"TEC Patio I" brochure, Thermal Engineering Corporation.
"The Searmaster" brochure, ©1987 Thermal Engineering Corporation.
"Sterling Infra–red Gas Grill" brochure, Thermal Engineering Corporation.

Primary Examiner—Ira S. Lazarus
Assistant Examiner—Josiah C Cocks
Attorney, Agent, or Firm—Merek & Voorhees

[57] ABSTRACT

The present invention provides a fast cooking system through the use of an oven having radiant burners located interiorly at the top portion thereof. The oven includes a rotary spit on which the meat is supported and rotated to prevent burning. A blower is located at the lower portion of the oven below the spit to remove smoke and simultaneously pull heat from the top of the oven causing airflow downwardly from the top of the oven. The blower facilitates combustion and increases cooking efficiency and eliminates the need for a Ni-Cad screen adjacent the ceramic plates.

3 Claims, 3 Drawing Sheets

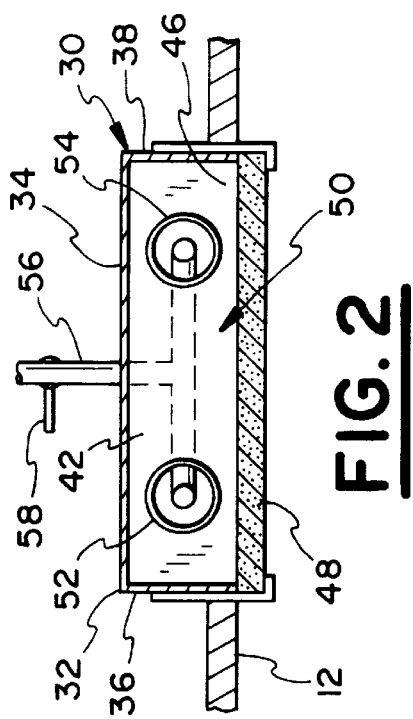
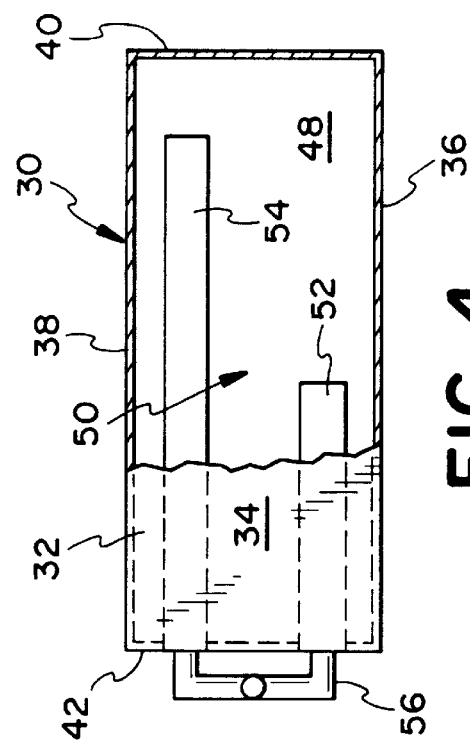
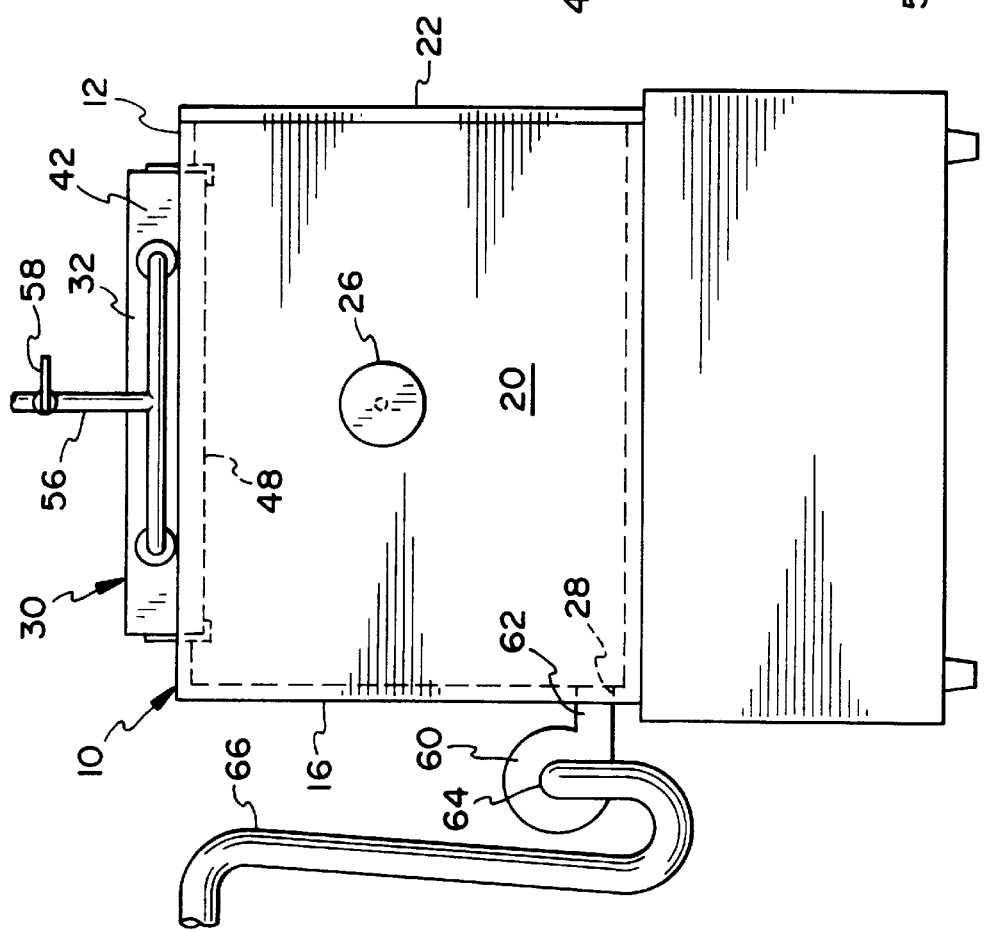

RADIANT COOKING WITH BURNERS MOUNTED OVER THE COOKING MEDIUM

FIELD OF THE INVENTION

The present invention relates to cooking using high temperature radiant heating in a closed oven to heat food quickly to enhance flavor and cooking efficiency.

BACKGROUND OF THE INVENTION

Installation of radiant burners above the food to be cooked results in several advantages. Importantly, juices falling from the cooking food will not fall on the burners. This reduces flare-up and smoke in the cooking process. Without juices or fats falling on the burners, there is no chance for the meat to be overcooked, to char or catch on fire. Further, when using a rotisserie, the burner can be set at a high temperature so that the radiant heat rays penetrate into the food which provides fast and efficient cooking without burning. The end result is a much juicier, tender and flavorful product as compared to other types of cooking. When using the above-mounted burners for grid-type cooking for hamburgers or sliced meats, a highly polished plate of stainless steel is placed below the grid. This plate acts as a reflector and catches juice drippings. The juice drippings sizzle and gently flare which creates a flavoring aid. With the grid-type cooking, the burner is again set at the high setting of preferably 1600 degrees fahrenheit during the entire cooking period. This tends to seal the juices into the meat as it cooks. A small amount of juice falls to the grids and the plate below the grids, but most stays within the meat product.

In view of the foregoing, it can be seen that there is a need for a new radiant burner cooking system which provides a fast cooking time and a flavorful cooked product.

SUMMARY OF THE INVENTION

The present invention provides a fast cooking system through the use of an oven having radiant burners located interiorly at the top portion thereof. The oven includes a rotary spit on which the meat is supported and rotated to prevent burning. The oven can also have a grid for supporting hamburger patties or slice meats and a highly polished stainless steel reflector plate below the grid. A blower, e.g. a draft fan, is located at the lower portion of the oven below the spit to remove smoke and simultaneously pull heat from the top of the oven by causing airflow downwardly from the top of the oven. The blower facilitates combustion and increases cooking efficiency and eliminates the need for a Ni-Cad screen adjacent the ceramic plates.

Accordingly, it is an object of the invention to provide a radiant burner oven having an overhead burner system capable of generating high heat output.

Another object of the invention is to provide a method of cooking using a radiant heating system to cook meats quickly and enhance the flavor of the cooked products.

Still another object of the invention is to provide a cooking apparatus having a draft fan to pull air from the top of the oven interior to the bottom thereby generating an efficient combustion and high temperature heat at the ceramic burners.

Other objects, uses and advantages will be apparent from a reading of this description which proceeds with reference to the accompanying drawings forming a part thereof.

BRIEF DESCRIPTION OF THE DRAWINGS

FIG. 2 is a cross-sectional view taken along line 2—2 of FIG. 1 of the burner assembly;

FIG. 3 is a side view of the oven;

FIG. 4 is a top view of the oven with a portion of the burner assembly broken away to reveal the burner tubes.

DESCRIPTION OF THE PREFERRED EMBODIMENT

This invention will now be described by way of example only with reference to the accompanying drawings. It should be appreciated however that modifications and improvements may be made to the invention without departing from the spirit thereof.

Figure 1:
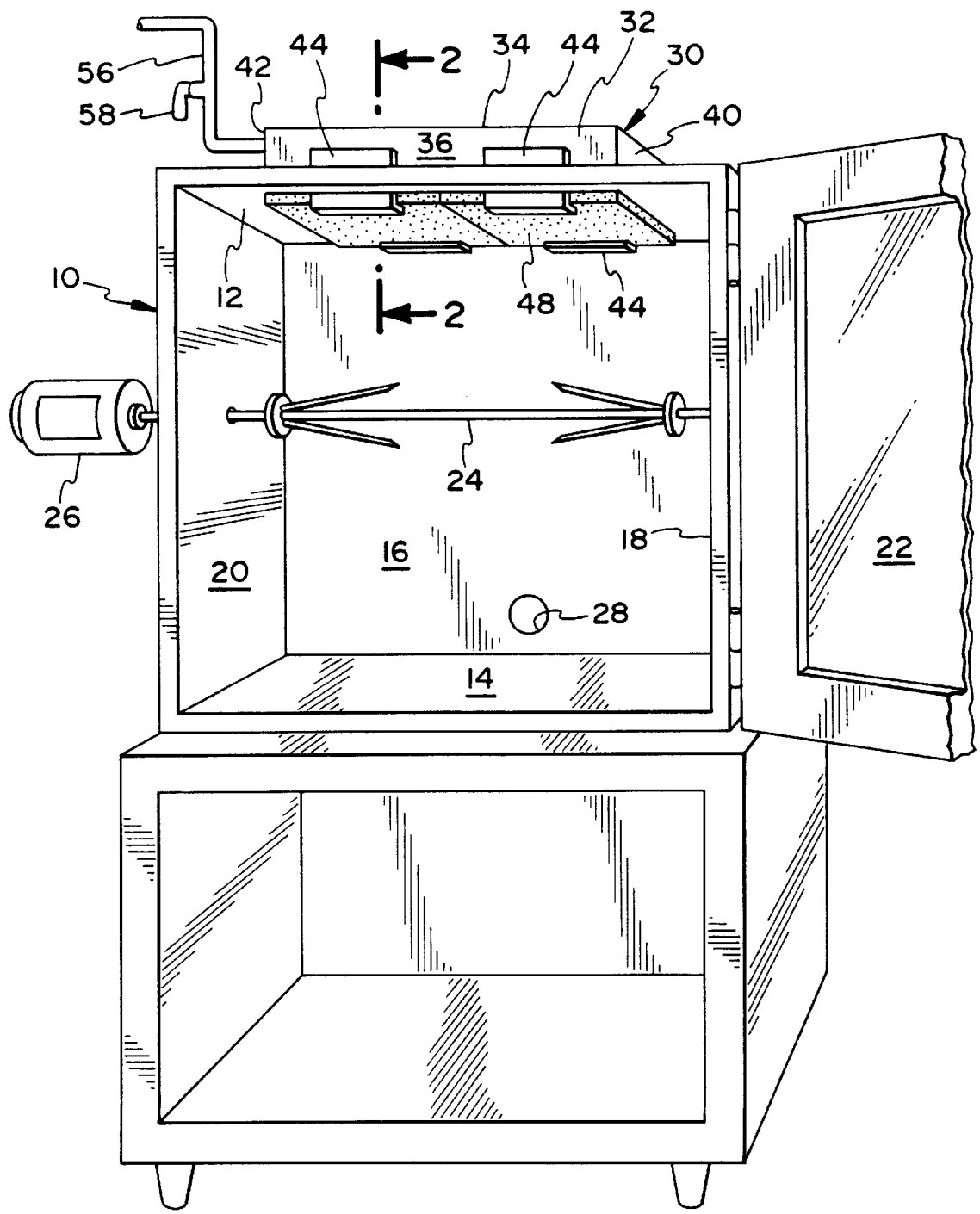
FIG. 1 is a front view of the oven with the door open to reveal the interior.

Referring to FIG. 1, an oven 10 includes a top wall 12, a bottom wall 14, a rear wall 16, a right side wall 18, a left sidewall 20 and a hinged door 22. All of the walls 12, 14, 16, 18, 20 and door 22 are constructed of non-combustible materials and are preferably steel and glass. The oven 10 may vary in size, but is preferably about two feet high and about three feet wide. A steel spit 24 is rotatably mounted within the oven 10 preferably 8 inches from top wall 12 and extends across oven 10 from wall 20 to wall 18. An electric motor 26 is located exteriorly of the oven 10 adjacent wall 26 and is connected to spit 24 for rotating spit 24. It should be understood that the motor 26 may be a variable speed motor and may be mounted on either side 18 or 20 of oven 10. Exhaust vent 28 is located in rear wall 16 adjacent bottom wall 14.

Radiant burner assembly 30 is located at top wall 12. Burner assembly 30 includes an inverted pan 32 preferably formed of heat resistant non-combustible material such as steel having a top wall 34, front wall 36, rear wall 38 (shown in FIG. 2), right side wall 40 and left side wall 42. The pan may vary in length and width but is preferably about 28 inches long by about 12 inches wide. Front wall 36 and rear wall 38 include brackets 44 extending past a bottom opening 46 for supporting ceramic plates 48.

Now referring to FIG. 2, burner assembly 30 is shown having inverted pan 32 having a bottom opening 46. At bottom opening 46 is located ceramic burner plates 48 which are attached to the pan 32. The porous ceramic burner plates 48 are of themselves conventional in design, having been formed to be porous to allow the gas-air mixture to flow therethrough. The gas-air mixture for combustion is fed to the interior 50 of pan 32 by tubes 52 and 54. Gas is supplied to tubes 52 and 54 from gas line 56 having an on-and-off valve 58. The ignition system is not shown, however any conventional ignition system may be used or a pilot light system may also be substituted. Gas tubes 52 and 54 are of unequal length in order to disperse the gas-air mixture in the chamber 58 formed by pan 32 and porous ceramic burner plates 48.

Now referring to FIG. 3, blower motor 60 is shown behind the rear wall 16 of oven 10. Blower motor 60 preferably has an air intake 62 connected to exhaust vent 28 at rear wall 16. The air outlet 64 of blower motor 60 is connected to exhaust pipe 66 to facilitate exhaust of the heated air out of the building in which the oven 10 is located. Blower motor 60 causes a pressure drop within the oven 10. This pressure drop has an effect on the burner assembly 30 by drawing air through the porous ceramic burner plates 48 and enhances combustion by pulling the combustion gases from chamber 58 through porous ceramic burner plates 48 creating a high efficiency flame to obtain a high temperature radiant heating surface of about 1600 degrees fahrenheit. The blower motor must be capable of withstanding high temperatures. In the preferred embodiment, the motor is a Dayton Blower Model No. 5C085 of metal construction and operates at 2300 rpm with a maximum inlet temperature rating of 450 degrees fahrenheit. The use of a blower motor eliminates the requirement of a Nickel-Cadmium screen to facilitate combustion at the surface of the porous ceramic burner plates 48.

In FIG. 4, a portion of pan 32 is broken away to reveal burner tubes 52 and 54 and porous ceramic burner plates 48.

Figure 5:
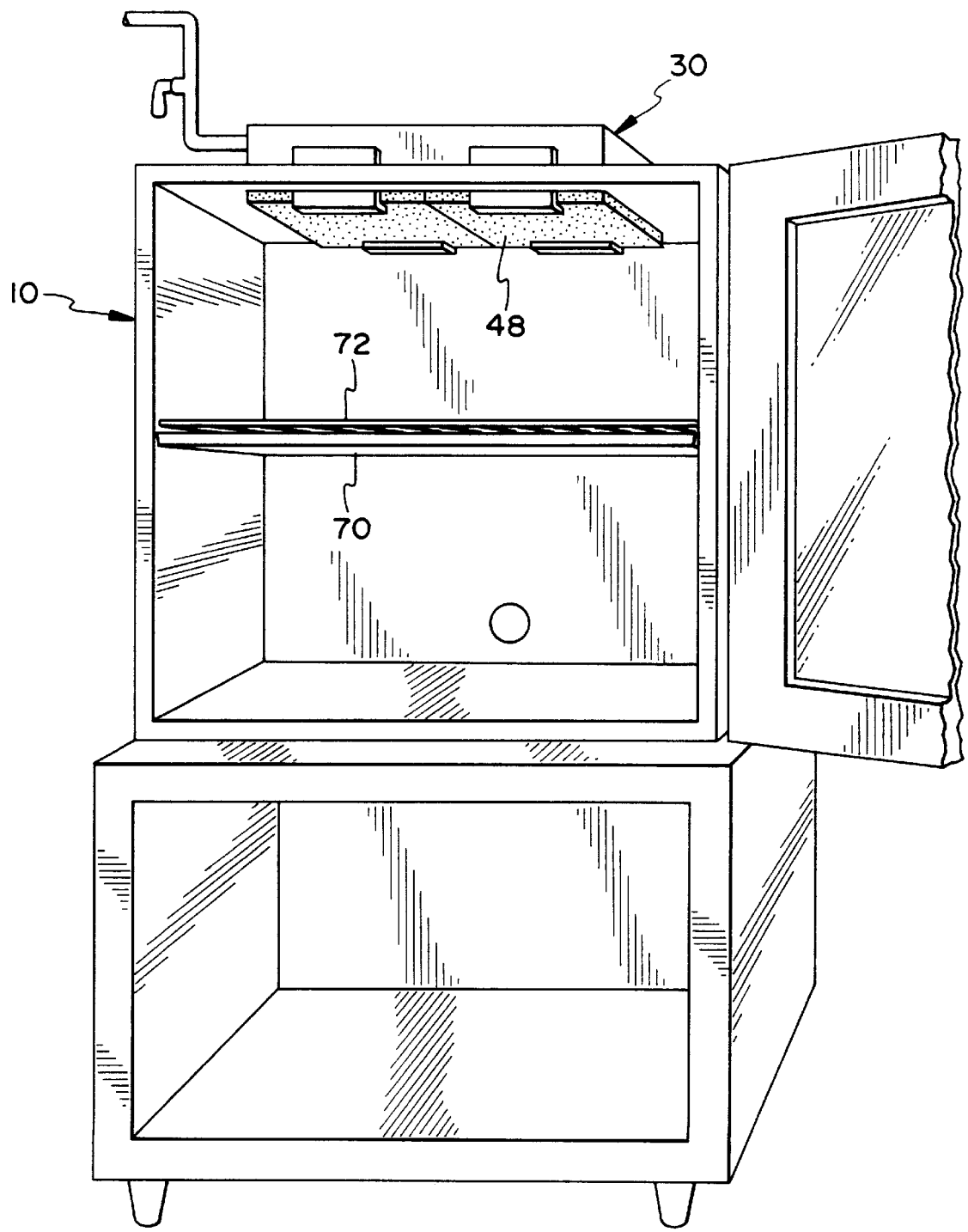
FIG. 5 is a front view of the oven used with grid cooking.

Now referring to FIG. 5, a grid type cooking arrangement is shown having a grid 72 located about 10 inches below porous ceramic burner plates 48. Below grid 72 is a highly polished stainless steel plate 70 which reflects radiant heat to increase cooking speed of hamburgers and thin meat products. This plate acts as a reflector and catches juice drippings. The juice drippings sizzle and gently flare which creates a flavoring aid. With the grid-type cooking, the burner is again set at the high setting of preferably 1600 degrees fahrenheit during the entire cooking period. This tends to seal the juices into the meat as it cooks. A small amount of juice falls to the grids and the plate below the grids, but most stays within the meat product.

While this invention has been described as having a preferred design, it is understood that it is capable of further modifications, uses and/or adaptions of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

What is claimed is:

1. A cooking apparatus for radiant heating of food products, comprising:
   a) an enclosure having an interior compartment formed by a top wall, a bottom wall, side walls, a rear wall and a door which can be opened for accessing the interior compartment;
   b) a radiant burner assembly located in said top wall for directing radiant heat downwardly from said top wall;
   c) a food product support for supporting a food product at a predetermined distance from said radiant burner assembly; and,
   d) said radiant burner assembly includes an enclosed chamber for receiving combustible gas and air above a porous ceramic burner plate whereby infrared heat radiation travels directly from said porous ceramic burner plate to a food product supported on said food product support, and
   e) a blower assembly for causing a pressure drop within the enclosure to facilitate the simultaneous combustion of the gas-air mixture at the surface of the porous ceramic burner plate and withdrawal of smoke from the enclosure.

2. The cooking apparatus as set forth in claim 1, wherein:
   a) said food product support includes a highly polished stainless steel plate for supporting food products and reflecting infrared heat.

3. The cooking apparatus as set forth in claim 1, wherein:
   a) said radiant burner assembly operates at a temperature of approximately 1600 degrees Fahrenheit.

* * * * *